(12) United States Patent
Konno et al.

(10) Patent No.: US 7,304,565 B2
(45) Date of Patent: Dec. 4, 2007

(54) VEHICLE-USE ELECTRONIC KEY SYSTEM

(75) Inventors: Takeshi Konno, Saitama (JP); Akira Komaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 150 days.

(21) Appl. No.: 10/529,300

(22) PCT Filed: Sep. 25, 2003

(86) PCT No.: PCT/JP03/12274

§ 371 (c)(1),
(2), (4) Date: Mar. 25, 2005

(87) PCT Pub. No.: WO2004/031024

PCT Pub. Date: Apr. 15, 2004

(65) Prior Publication Data

US 2006/0022793 A1 Feb. 2, 2006

(30) Foreign Application Priority Data

Sep. 30, 2002 (JP) ............... 2002-284746
Sep. 30, 2002 (JP) ............... 2002-285176

(51) Int. Cl.
*B60R 25/10* (2006.01)
(52) U.S. Cl. ............... 340/426.36; 340/5.72; 307/10.2

(58) Field of Classification Search ........... 340/426.36, 340/5.72, 426.1, 825.69, 10.1, 309.16, 815.4, 340/432; 307/10.2; 701/1
See application file for complete search history.

(56) References Cited

U.S. PATENT DOCUMENTS 4,688,036 A    8/1987   Hirano et al.

(Continued)

FOREIGN PATENT DOCUMENTS

DE    10034348    1/2002

(Continued)

*Primary Examiner*—Phung T. Nguyen
(74) *Attorney, Agent, or Firm*—Carrier, Blackman & Associates, P.C.; Joseph P. Carrier; William D. Blackman

(57) ABSTRACT

A vehicle-use electronic key system includes a control unit mounted on a real car, and an electronic key for sending a response signal on receiving a request signal sent from the control unit via a transmission antenna, the antenna being installed near the middle of the real car. Specifically, when a line segment (wheel base) connecting the center of a front wheel to the center of a rear wheel is assumed, the transmission antenna is installed in any location within a range from the upper part to the lower part of the real car within a range from a ¼ point to a ¾ point of the wheel base with the center of the front wheel as a reference.

5 Claims, 18 Drawing Sheets

U.S. PATENT DOCUMENTS

| | | | |
|---|---|---|---|
| 5,157,389 A | 10/1992 | Kurozu et al. | |
| 5,293,160 A | 3/1994 | Kurozu et al. | 340/825.32 |
| 5,343,077 A | 8/1994 | Yoshida et al. | 307/9.1 |
| 5,689,142 A | 11/1997 | Liu | 307/10.5 |
| 5,939,975 A | 8/1999 | Tsuria et al. | 340/426 |
| 6,057,657 A | 5/2000 | Kitamura | 318/16 |
| 6,188,141 B1 * | 2/2001 | Daviaud | 307/10.5 |
| 6,194,997 B1 | 2/2001 | Buchner et al. | |
| 6,236,850 B1 | 5/2001 | Desai | |
| 6,386,447 B1 | 5/2002 | Proefke et al. | 235/380 |
| 6,621,406 B2 | 9/2003 | Kumano | 340/5.62 |
| 6,798,337 B2 * | 9/2004 | Onuma et al. | 340/5.72 |
| 6,944,528 B2 * | 9/2005 | Nagano | 701/49 |
| 6,946,949 B2 * | 9/2005 | Heide et al. | 340/5.61 |
| 7,196,612 B2 | 3/2007 | Sumada et al. | |
| 2004/0217846 A1 | 11/2004 | Konno et al. | 340/5.73 |

FOREIGN PATENT DOCUMENTS

| | | |
|---|---|---|
| EP | 0860353 | 8/1998 |
| EP | 1 211 170 A2 | 6/2002 |
| EP | 1445180 | 8/2004 |
| FR | 2751293 | 1/1998 |
| JP | 60-117824 | 6/1985 |
| JP | 01-164682 | 6/1989 |
| JP | 03-021575 | 1/1991 |
| JP | 03-217660 | 9/1991 |
| JP | 03-295777 | 12/1991 |
| JP | 04-011587 | 1/1992 |
| JP | 04-038246 | 2/1992 |
| JP | 04-183690 | 6/1992 |
| JP | 07-180408 | 7/1995 |
| JP | 09-044229 | 2/1997 |
| JP | 10-317754 | 12/1998 |
| JP | 11-241539 | 9/1999 |
| JP | 2000-103316 | 4/2000 |
| JP | 2000-104429 | 4/2000 |
| JP | 2001-012123 | 1/2001 |
| JP | 2001-278142 | 10/2001 |
| JP | 2001-278156 | 10/2001 |
| JP | 2001-279975 | 10/2001 |
| JP | 2001-349110 | 12/2001 |
| JP | 2002-201838 | 7/2002 |
| JP | 2002-225760 | 8/2002 |
| WO | WO 02/29734 | 4/2002 |

* cited by examiner

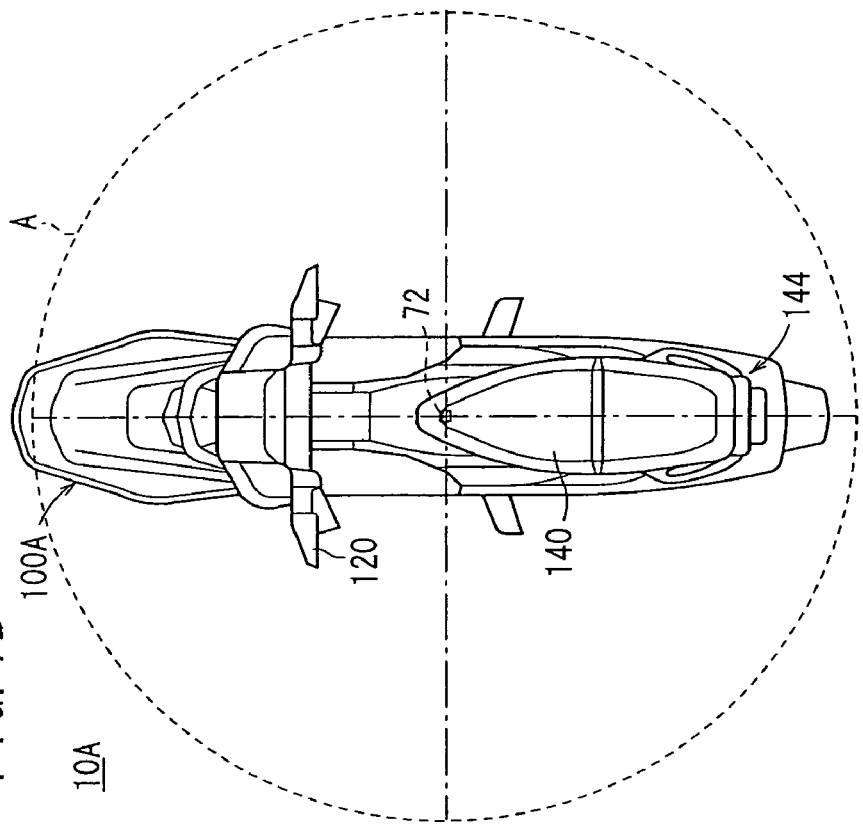
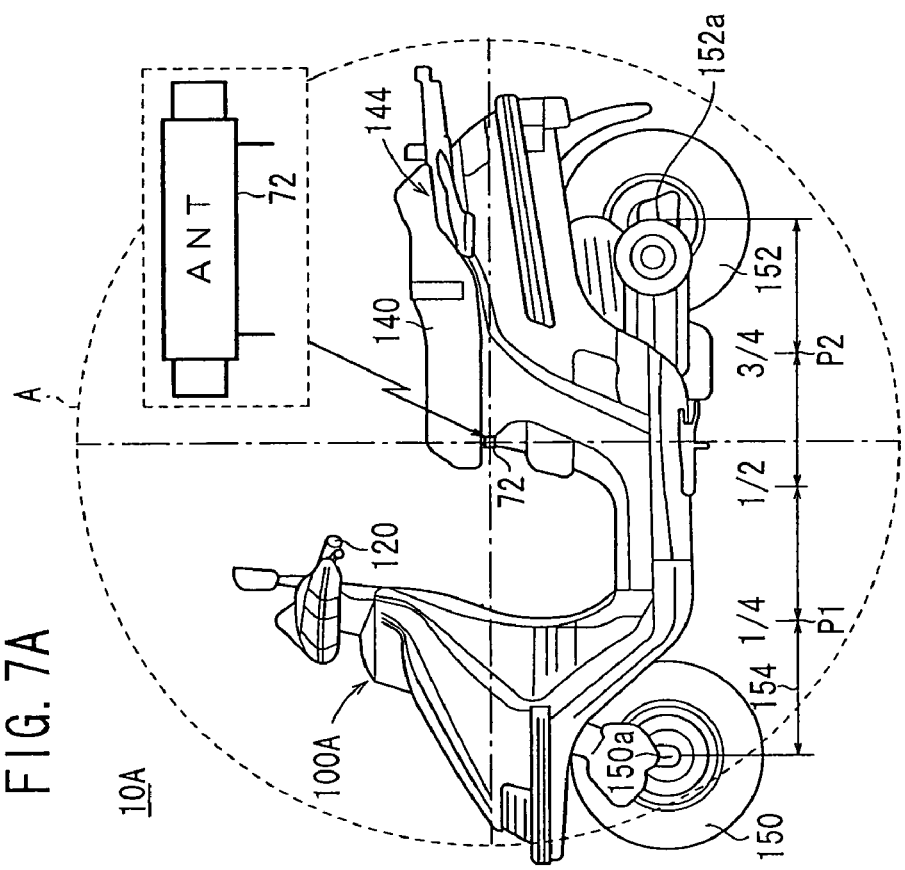
FIG. 7A
FIG. 7B

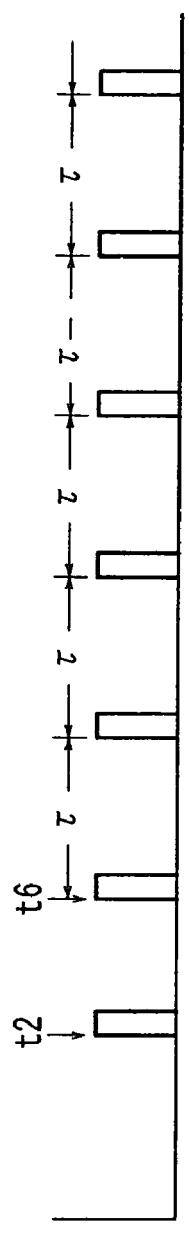
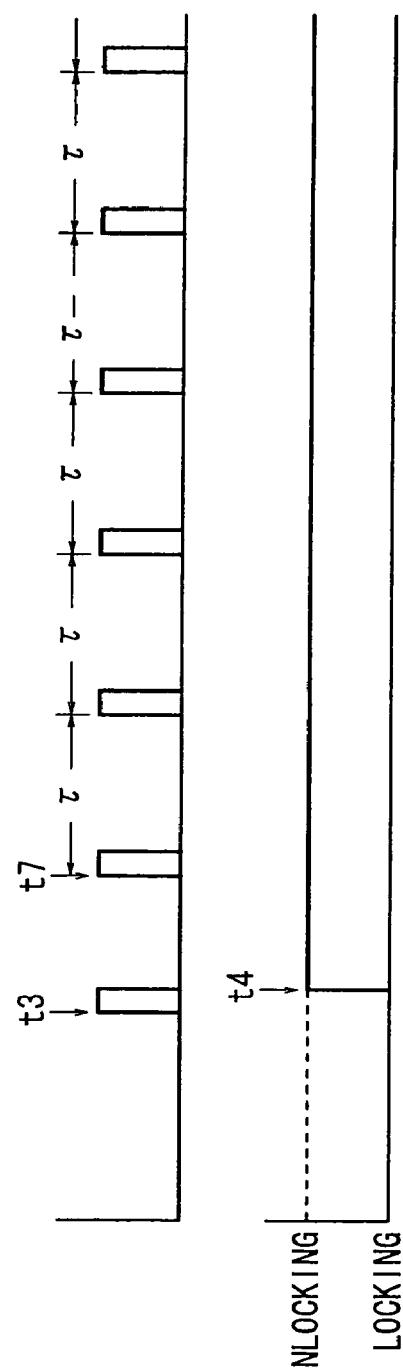
FIG. 12A STARTING SW
FIG. 12B MAIN SW
FIG. 12C Sr
FIG. 12D Sa
FIG. 12E Act

VEHICLE-USE ELECTRONIC KEY SYSTEM

TECHNICAL FIELD

This invention relates to an electronic key system for a vehicle wherein radio communication is performed between a transmitter/receiver (electronic key) carried by a user and a control apparatus mounted on an actual vehicle to verify an ID and, if a communication received originates from a legal user, then starting of an engine or some other action is performed. More particularly, this invention relates to an electronic key system for a vehicle suitable for use with, for example, a motorcycle.

BACKGROUND ART

An electronic key system for a vehicle is disclosed, for example, in Japanese Laid-Open Patent Publication No. 2001-349110 and Japanese Laid-Open Patent Publication No. 2001-349117. In the electronic key system for a vehicle disclosed in Japanese Laid-Open Patent Publication No. 2001-349110 and Japanese Laid-Open Patent Publication No. 2001-349117, starting means (switches) are provided on a door handle and a trunk lid of an actual vehicle. If a user operates (starts) any of the starting means, then communication of a control apparatus with an electronic key begins. Then, the control apparatus verifies an ID transmitted thereto from the electronic key with an ID registered therein. Thus, if it is verified that the IDs are coincident with each other, then the doors are unlocked and so forth.

Further, in Japanese Laid-Open Patent Publication No. 2001-349110 and Japanese Laid-Open Patent Publication No. 2001-349117 described above, a starting means (switch) is provided also on an ignition switch. If the user operates the ignition switch after the user gets on the four-wheeled car, then the communication between the electronic key and the starting means is performed again to perform ID verifying for permitting starting of the engine. Then, if it is verified that the IDs are coincident with each other, the engine is started.

In particular, in the conventional vehicle electronic key system for a four-wheeled car, the electronic key functions both to unlock a door and to permit starting of an engine.

Further, as a different prior art apparatus, an electronic key system is proposed (refer to, for example, Japanese Laid-Open Patent Publication No. 10-317754) wherein transmitting antennas are provided individually for doors of a four wheeled car, and only that one of the doors which is approached by a portable device can be unlocked independently of the other doors of the vehicle.

In this manner, in the electronic key system described above, the range of transmitting from the control apparatus mounted on an actual vehicle in the communication between the control apparatus and the electronic key is small in comparison with that from the electronic key. Therefore, in the prior art apparatus described above, a plurality of transmitting antennas for outputting a signal from the control apparatus are provided depending upon different applications.

Incidentally, in order to apply such an electronic key system to a motorcycle, at least when a user gets on and activates the vehicle and when the user operates the vehicle, it is necessary for the user to communicate with certainty with the electronic key carried by the user.

Particularly in a motorcycle such as a scooter wherein a helmet can be accommodated or stored in a space provided under a seat, it is necessary that the control apparatus communicates with the electronic key with certainty. This applies not only when the user gets on and operates the vehicle and when the user is traveling with the vehicle, but also upon opening or closing of the seat and when the electronic key is accommodated in the helmet storage space.

Particularly where the vehicle is a motorcycle of a large size, in order to achieve communication of the control apparatus with the electronic key in all of the situations described above, it is necessary to install a plurality of transmitting antennas at different locations such as a front portion and a rear portion of the actual vehicle. This may increase of the cost and the weight of the electronic key system and the installation space required for the electronic key system.

In a motorcycle such as a scooter wherein a helmet can be accommodated in a space provided under a seat, such a method as described below is available. In particular, a locking mechanism for locking an opening/closing mechanism of a seat is provided, for example, to prevent theft. Thus, if a legal user is recognized through communication of a control apparatus with an electronic key, then the seat is unlocked.

In such a case as just described, it is possible that an electronic key placed in a bag or the like is accommodated in a helmet storage space. In such a manner of use as just described, if communication between the control apparatus and the electronic key is interrupted, then there is the possibility that the seat cannot be unlocked, that is, shut-in of the baggage may occur.

SUMMARY OF THE INVENTION

The present invention has been made in view of the issues described above, and it is an object of the present invention to provide an electronic key system for a vehicle by which communication of a control apparatus with an electronic key in all of the situations described above can be achieved without an increase in the cost and the weight, or an increase in the required installation space, and so forth, of the electronic key system.

Another object of the present invention to provide an electronic key system for a vehicle wherein, even if an electronic key is placed in a helmet storage space, communication of the control apparatus with the electronic key can be performed with certainty, and a so-called shut-in state of a baggage and so forth can be prevented.

According to the present invention, an electronic key system for a vehicle which includes a control apparatus mounted on a vehicle and an electronic key for transmitting a response signal in response to receiving of a request signal transmitted from the control apparatus through a transmitting antenna. The electronic key system is configured so that the transmitting antenna is installed in the proximity of the center of the vehicle.

Consequently, a request signal transmitted from the control apparatus is outputted from the location in the proximity of the vehicle. Therefore, almost the entire region of the vehicle is included in the transmitting range. As a result, communication of the control apparatus with the electronic key can be performed with certainty when the user gets on and operates the vehicle, when the user is traveling with the vehicle, upon an opening or closing operation of the seat and when the electronic key is stored in a helmet accommodating space. In this instance, since a single transmitting antenna may be installed, communication of the control apparatus with the electronic key in all of the situations described above can be achieved without increasing the cost and the weight of the device, or an increase of the required installation space and so forth.

Preferably, the transmitting antenna is installed at a position within a range from an upper portion to a lower portion of the vehicle, and within a range from a point at one fourth to another point at three fourths of a wheel base with reference to the center of a front wheel of the actual vehicle.

Particularly where the vehicle includes a seat on which a user is to be seated, preferably the transmitting antenna is installed in the proximity of a front portion of the seat.

According to the present invention, an electronic key system for a vehicle which includes a control apparatus mounted on a vehicle and an electronic key for transmitting a response signal in response to receiving of a request signal transmitted from the control apparatus through a transmitting antenna. The vehicle includes a seat provided for opening and closing movement and a locking apparatus for locking the seat which prevents the seat from being opened until unlocking instruction is supplied thereto. The control apparatus includes means for verifying the response signal and outputting an unlocking instruction to the locking apparatus when it is discriminated that the response signal is a request from a legal user. The transmitting antenna is installed on the seat or in the proximity of the seat.

Consequently, a request signal transmitted from the control apparatus is outputted from the seat or a position in the proximity of the seat. Therefore, the seat and a region around the seat are included in the transmitting range of the transmitter. As a result, even if the electronic key is shut in a helmet storage space, communication of the control apparatus with the electronic key can be performed with certainty and a so-called shut-in state of a baggage or the like can be avoided.

The transmitting antenna may be provided on a left side face of the seat. Normally, the user operates the seat to open or close standing on the left side of the vehicle. Therefore, by mounting the transmitting antenna on the left side face of the seat, communication of the control apparatus with the electronic key can be performed with certainty.

Where at least a seat handle which is used to open or close the seat by manual operation, is provided around a rear portion of the seat, the transmitting antenna may be provided on the seat handle.

Normally, the seat handle is mounted on a vehicle body after assembly of the vehicle. Therefore, the shape of the vehicle body or the path of wiring lines need not be changed significantly in order to provide the transmitting antenna. In other words, the transmitting antenna can be mounted with a slight design change, and also the cost can be reduced advantageously.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A is a side elevational view showing an example of a location of a transmitting antenna on an actual vehicle (See FIG. 6).

FIG. 7B is a plan view of the same.

FIGS. 12A to 12E are timing charts illustrating processing operation of the electronic key system according to the present embodiment.

DETAILED DESCRIPTION OF THE INVENTION

In the following, an embodiment wherein an electronic key system for a vehicle according to the present invention is applied, for example, to a system of a motorcycle is described with reference to FIGS. 1 to 18.

Figure 1:
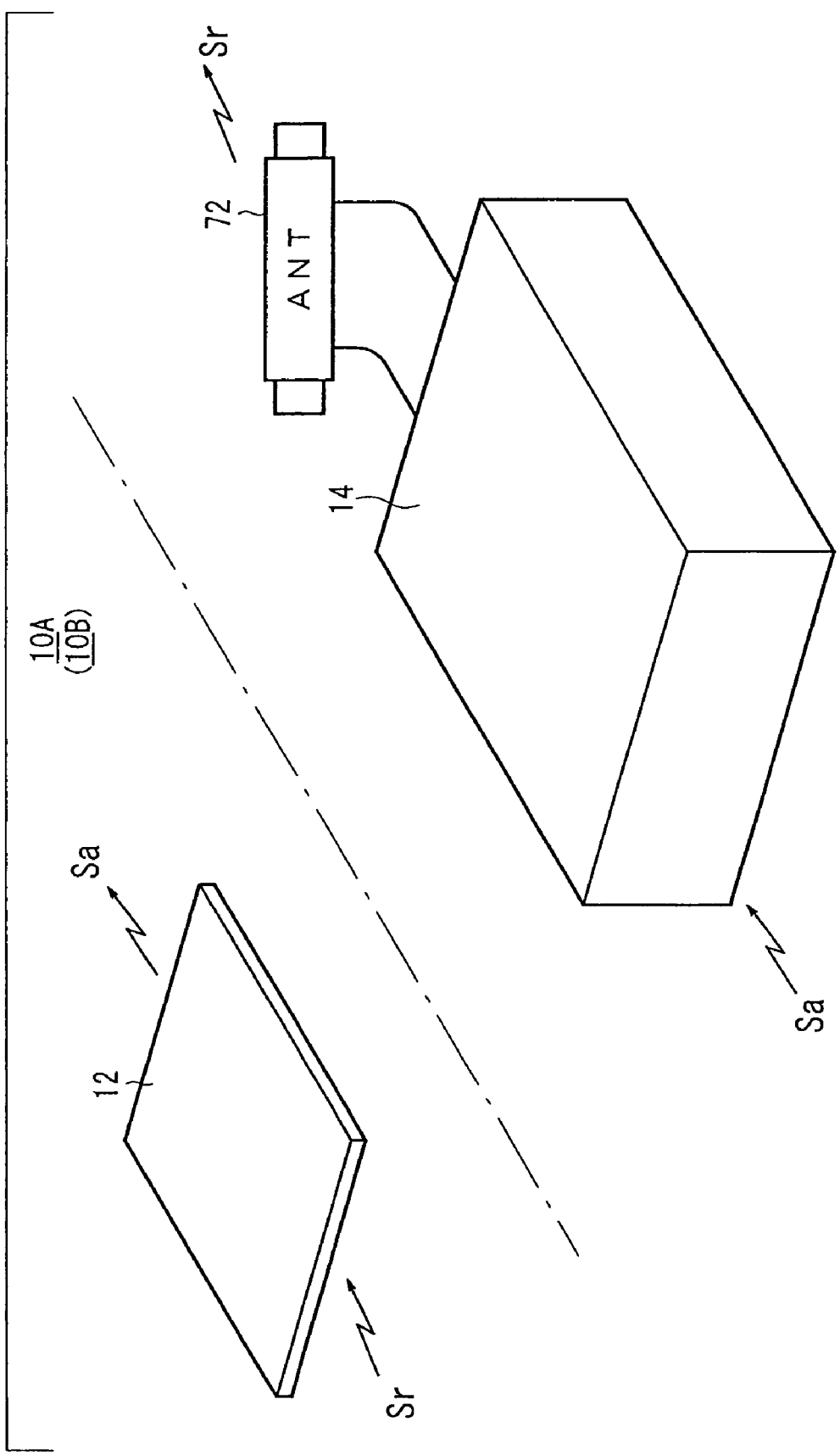
FIG. 1 is a schematic view showing an electronic key system according to a first embodiment and a second embodiment.
Figure 8:
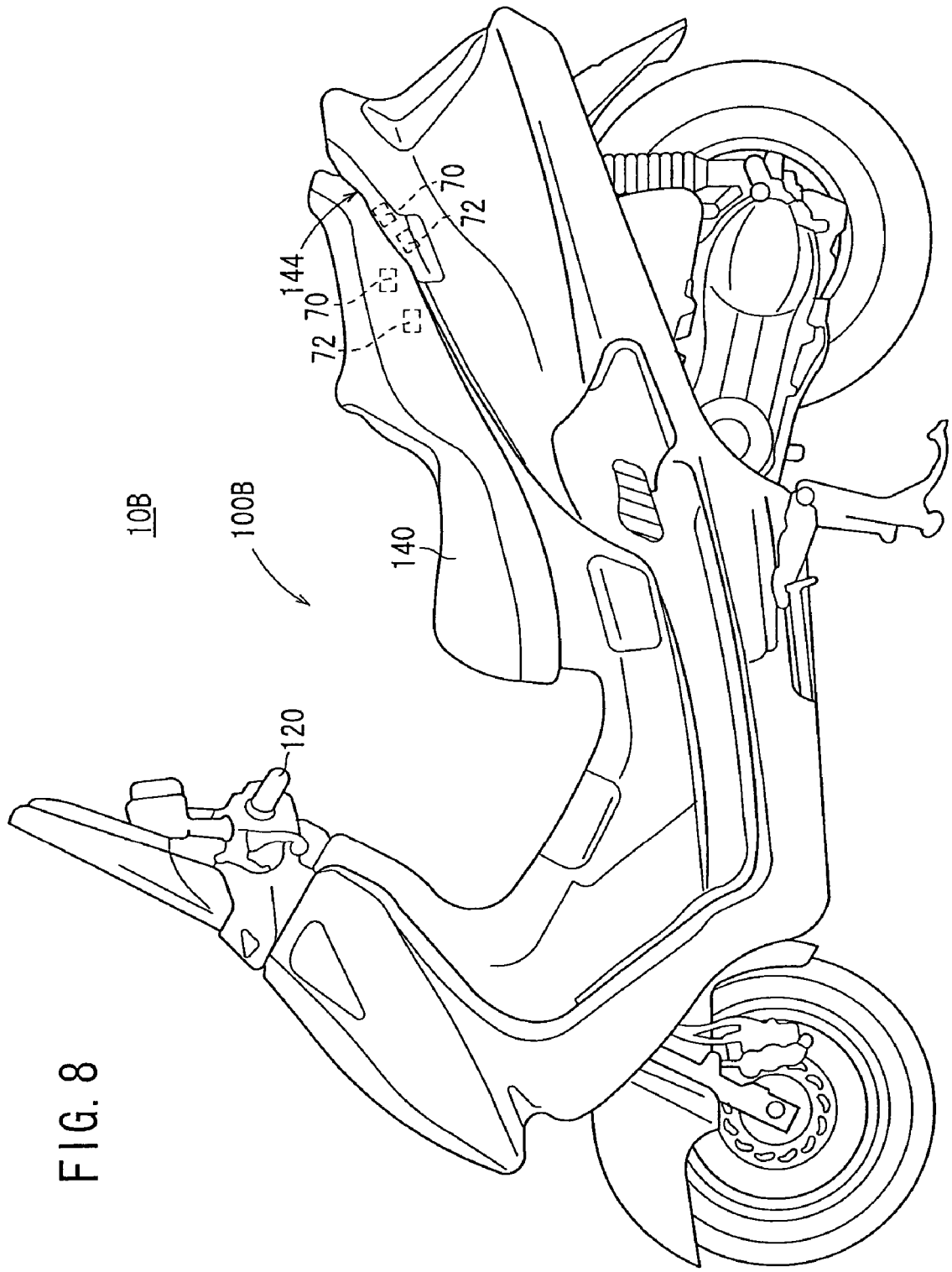
FIG. 8 is a schematic view showing an example wherein a starting switch and a transmitting antenna are provided on a seat or a seat handle on an actual vehicle of the scooter type which is used by the second embodiment.

Referring to FIG. 1, Each of electronic key systems 10A, 10B according to a first and a second embodiments includes an electronic key 12 to be carried by a user and a control apparatus 14 mounted on a vehicle 100A (refer to FIG. 6) and a vehicle 100B (refer to FIG. 8). The electronic key 12 has a shape of a key as an outer shape thereof and incorporates an IC chip therein. Alternatively, electronic key 12 may have the shape of a card as an outer shape thereof and incorporates an IC chip therein. However, electronic key 12 is not limited to these shapes and other keys are available. Where the electronic key system according to the present invention is principally applied as a key-less system, a key having a shape of a card is used. In the present specification described below, it is assumed that the electronic key 12 has a shape of a card.

Figure 2:
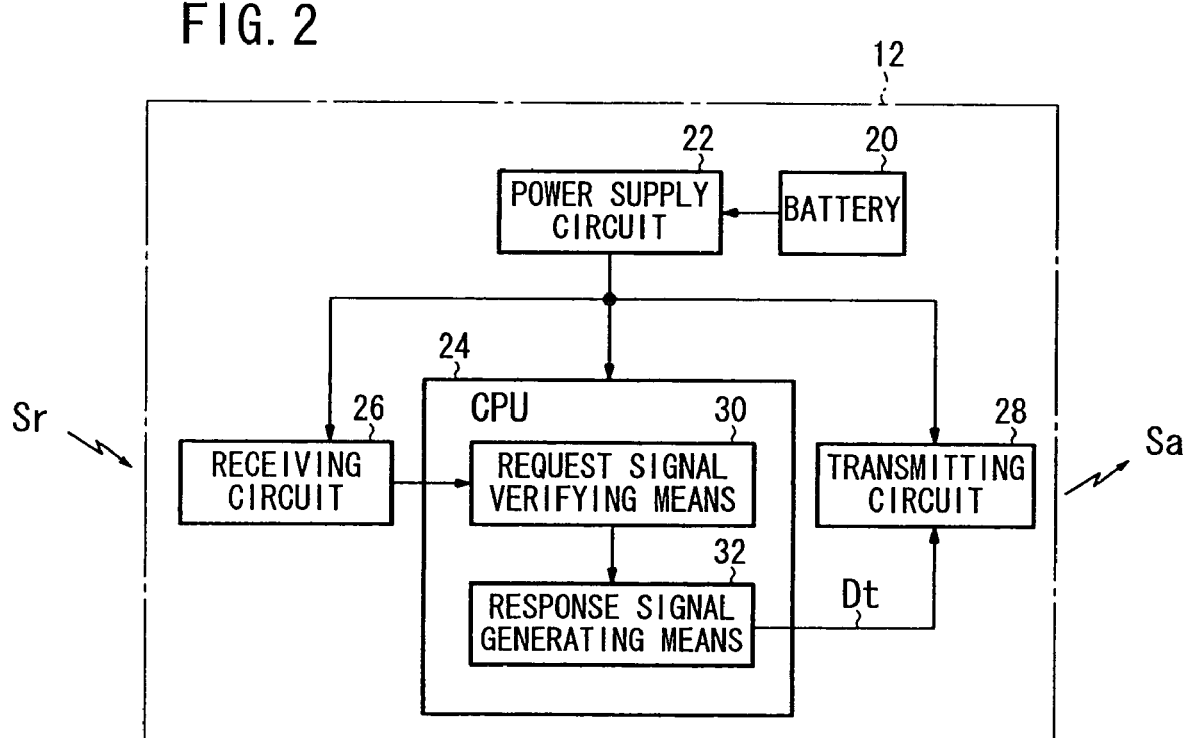
FIG. 2 is a block diagram showing a configuration of an electronic key.

Referring to FIG. 2, the electronic key 12 has a shape of a card as just described and includes a battery 20, a power supply circuit 22, a CPU 24, a receiving circuit 26 and a transmitting circuit 28 therein.

The power supply circuit 22 supplies power supplied from the battery 20 to the receiving circuit 26, the transmitting circuit 28 and the CPU 24. The receiving circuit 26 includes a receiving antenna not shown. Further, the receiving circuit 26 receives a request signal Sr and so forth transmitted thereto from the control apparatus 14 through the receiving antenna and extracts the signal from a carrier wave to decode the signal. The decoded signal is supplied to the CPU 24. The frequency of the carrier wave of the request signal Sr ranges from 100 kHz to 300 kHz.

The CPU 24 executes at least the following two computer programs: A request signal verifying means 30 and a response signal generating means 32. The request signal verifying means 30 verifies whether or not a signal supplied from the receiving circuit 26 is the request signal Sr. Thus, if the signal supplied is the request signal Sr, the request signal verifying means 30 passes the control to the response signal generating means 32. The response signal generating means 32 reads out ID data recorded in a ROM not shown based on a request from the request signal verifying means 30. Then, the response signal generating means 32 adds an attribute that indicates a response to the ID data and outputs the ID data as transmitting data Dt to the transmitting circuit 28. The transmitting circuit 28 includes a transmitting antenna not shown. The transmitting circuit 28 modulates a carrier wave in accordance with the transmitting data Dt supplied from the CPU 24 and transmits the modulated wave as a response signal Sa through the transmitting antenna. The frequency of the carrier wave of the response signal Sa ranges from 200 MHz to 500 MHz.

Figure 3:
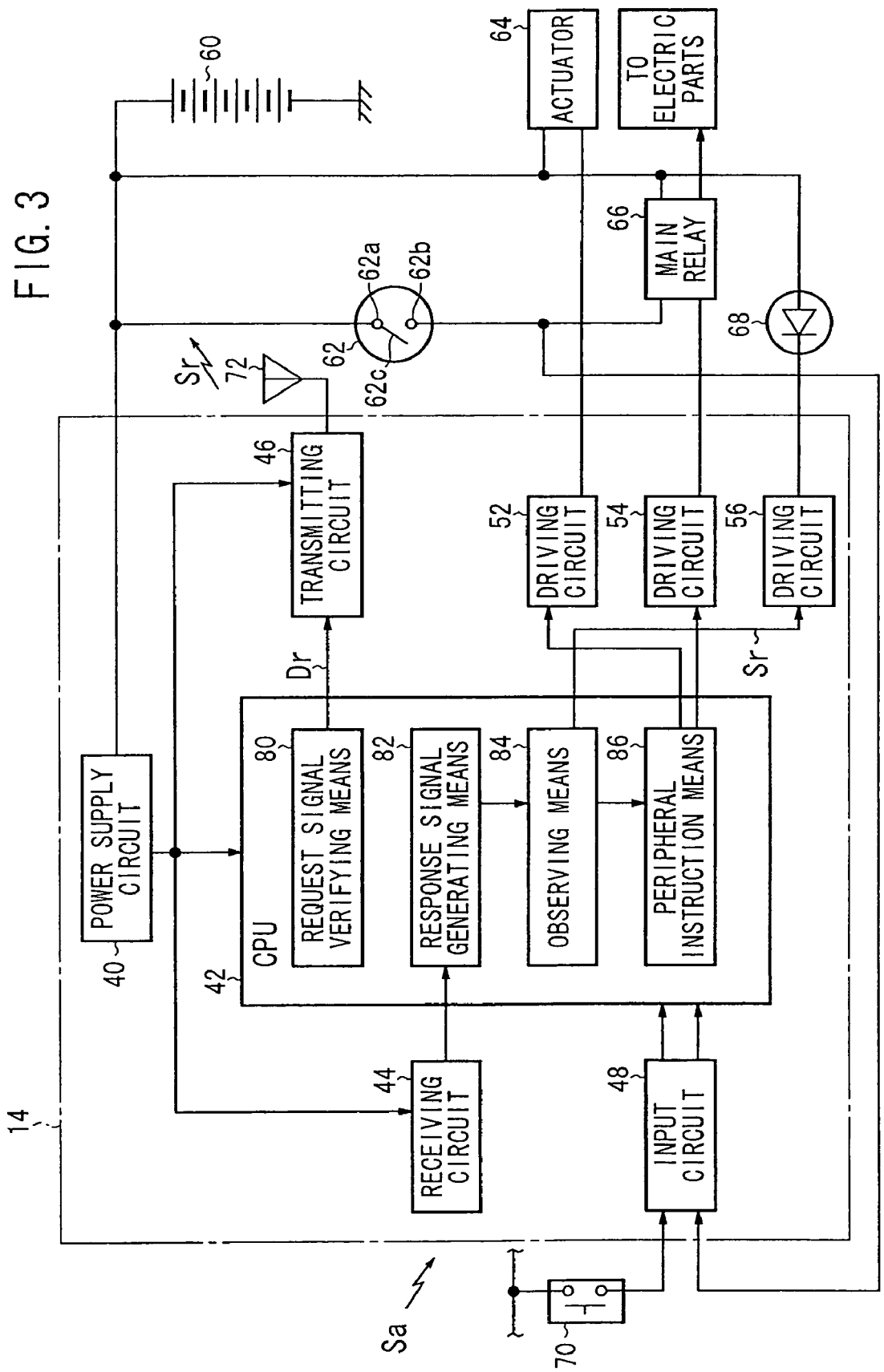
FIG. 3 is a block diagram showing a configuration of a control apparatus.

Meanwhile, the control apparatus 14 mounted on the actual vehicles 100A, 100B is formed from, for example, a system LSI. Further, for example, as shown in FIG. 3, the control apparatus 14 includes a power supply circuit 40, a CPU 42, a receiving circuit 44, a transmitting circuit 46, an inputting circuit 48, a first driving circuit 52 (for driving an actuator), a second driving circuit 54 (for driving a main relay) and a third driving circuit 56 (for driving an LED). At least a battery 60, a main switch 62, an actuator (driving source for a locking apparatus) 64, a main relay 66, a warning lamp 68 (LED), a starting switch 70 and a transmitting antenna 72 are installed around the control apparatus 14.

The main switch 62 has two fixed contacts 62a and 62b and a movable contact 62c. The fixed contact 62a is connected to the battery 60, and the other fixed contact 62b is connected to the inputting circuit 48 and the main relay 66.

Not only the fixed contact 62b of the main switch 62 but also the starting switch 70 are connected to the inputting circuit 48. An ON/OFF state of the starting switch 70 and an ON/OFF state of the main switch 62 are supplied to the CPU 42 through the inputting circuit 48.

Figure 4:
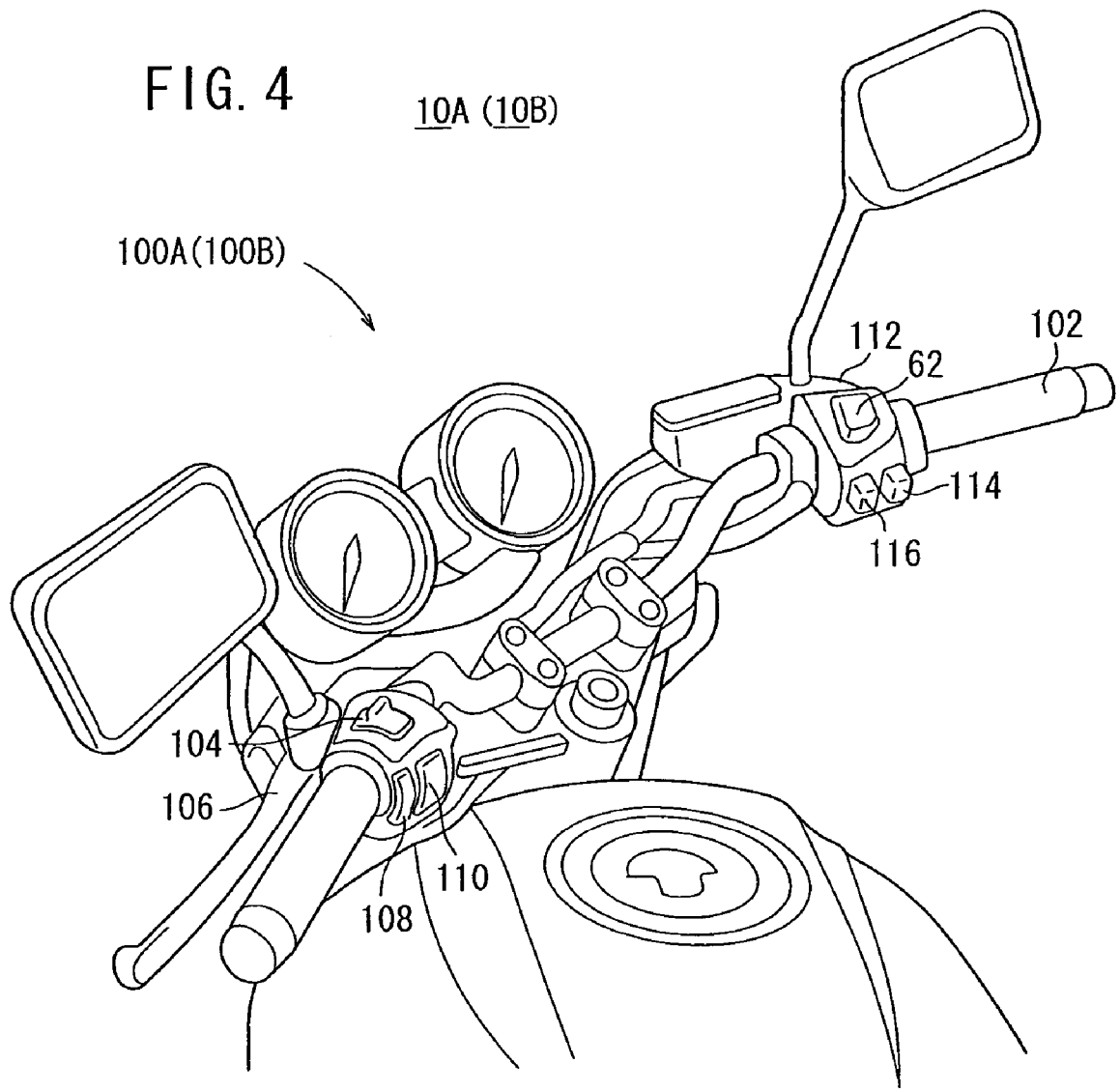
FIG. 4 is a schematic view showing an example of operation switches (switches which may be listed as a candidate of a starting switch) around a handle bar on an actual vehicle of the motorcycle type.

The starting switch 70 can be set to any one of, for example, an operation switch for starting an engine of the actual vehicles 100A, 100B, an operation switch for security during driving and an operation switch used for stopping the engine of the actual vehicles 100A, 100B. In particular, where each of the actual vehicles 100A, 100B is of the motorcycle type as shown in FIG. 4, any one of a lighting dimmer switch 104, a clutch switch 106, a winker switch 108, a horn switch 110, a front brake switch 112, a hazard switch 114 and a starter switch 116 which are installed around a handle bar 102 can be set as the starting switch 70.

Figure 5:
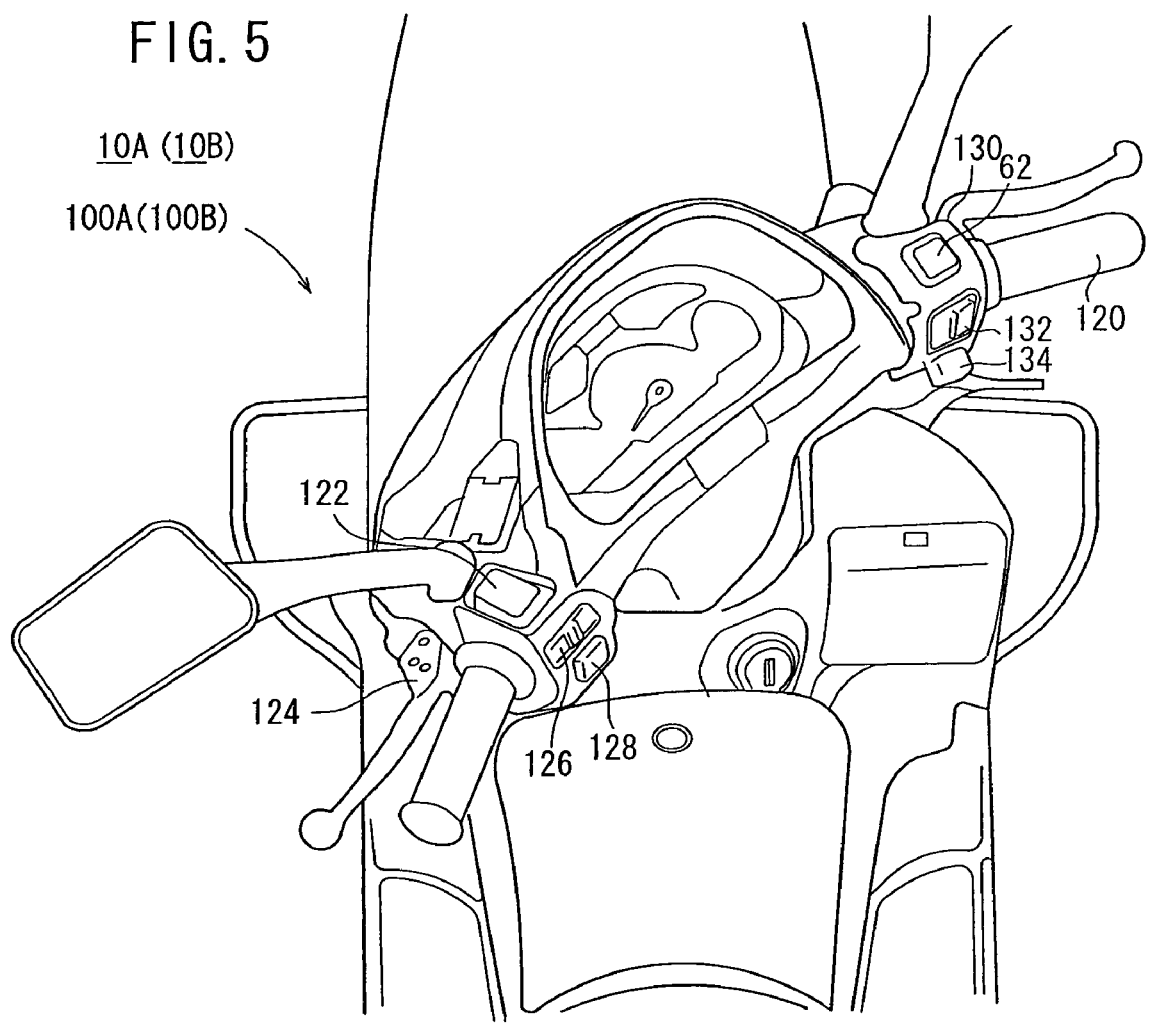
FIG. 5 is a schematic view showing an example of operation switches (switches which may be listed as a candidate of a starting switch) around a handle bar on another actual vehicle of the scooter type.

On the other hand, where each of the actual vehicles 100A, 100B is of the scooter type as shown in FIG. 5, any one of a lighting dimmer switch 122, a rear brake switch 124, a winker switch 126, a horn switch 128, a front brake switch 130, a hazard switch 132 and a starter switch 134 which are installed around a handle bar 120 can be set as the starting switch 70.

For the setting of the starting switch 70, a method is available wherein, for example, when a user purchases the actual vehicles 100A or 100B, the user decides the setting of the starting switch 70 upon contract with a dealer, and thereafter, wiring is performed in a factory based on the decision. In particular, for example, wiring for interconnection between a switch decided as the starting switch 70 and the inputting circuit 48 of the control apparatus 14 or a like operation is performed in a factory.

Figure 6:
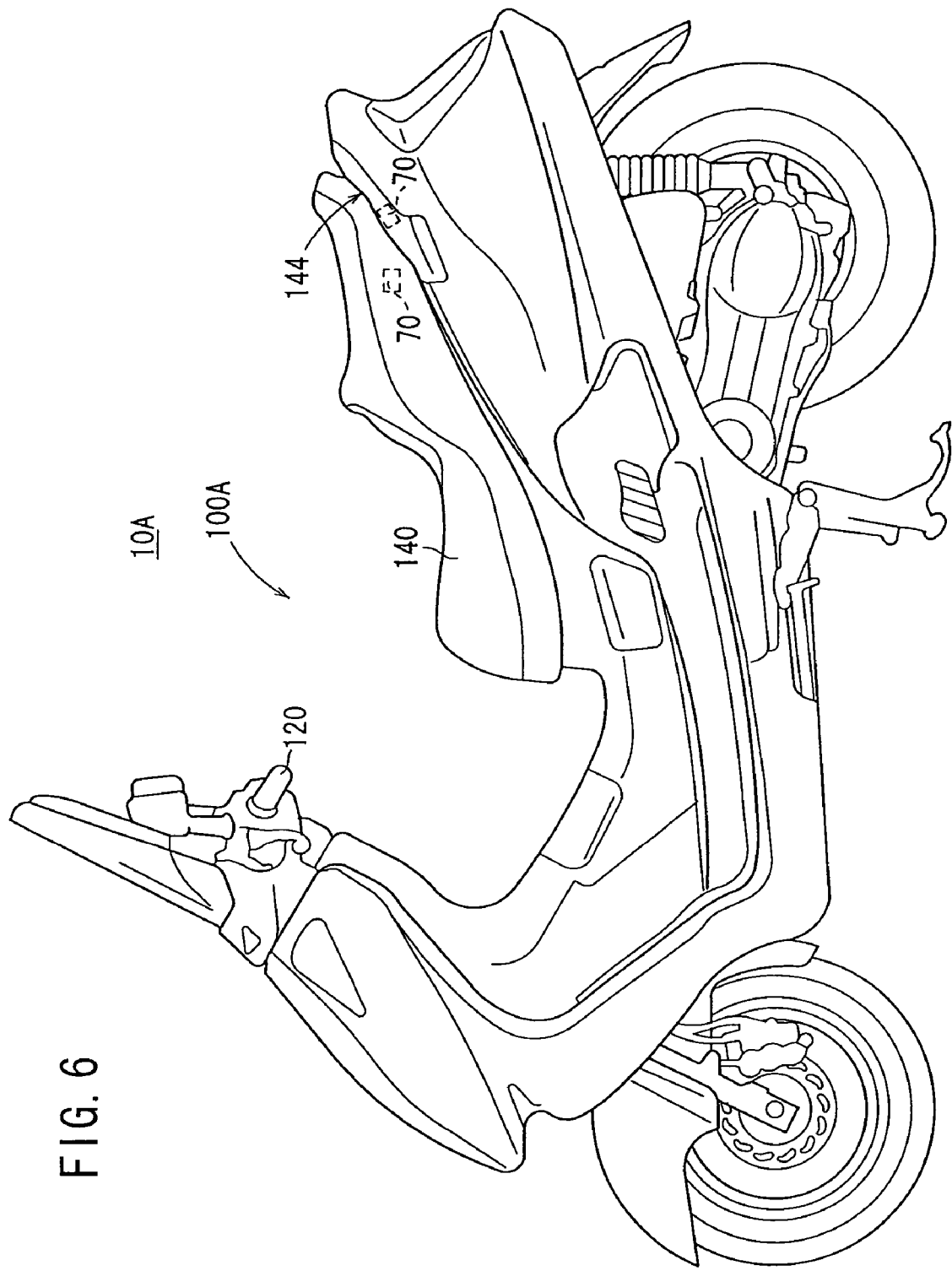
FIG. 6 is a schematic view showing an example wherein a starting switch is installed in the proximity of a seat on an actual vehicle of the scooter type which is used by the first embodiment.

As described above, the starting switch 70 may be set to any one of various switches installed around the handle bar 102 or 120. For example, in a scooter, as shown in FIG. 6, the starting switch 70 may be provided on the seat 140 or in the proximity of the seat 140.

Figure 9:
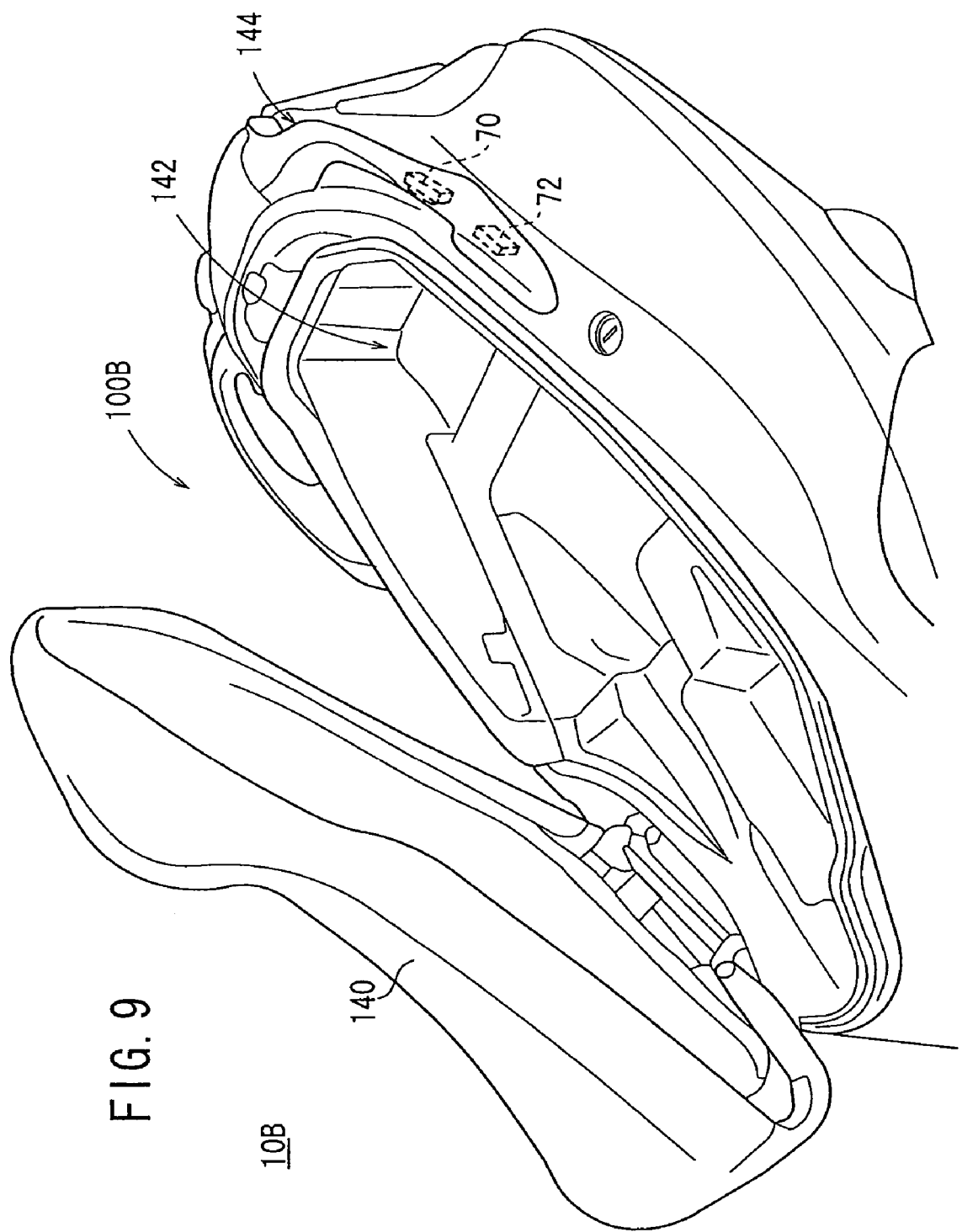
FIG. 9 is an enlarged view showing a state wherein a seat is opened.

A space 142 (helmet storage space) which can accommodate a helmet not shown is provided under the seat 140 as shown in FIG. 9. Normally, when the user does not ride the vehicle, a helmet is stored in the space. Further, depending upon the user, baggage may be accommodated in the space 142.

Further, at least a handle 144 (hereinafter referred to as seat handle 144 for the distinction from the handle bar 120 which is operated by a driver) used to open or close the seat 140 by manual operation is provided around a rear portion of the seat 140.

Accordingly, the starting switch 70 can be located on the seat handle 144, the inside of the seat 140 or the like. When the starting switch 70 is provided on the seat handle 144, preferably the starting switch 70 is provided at a portion of the seat handle 144 which is to be gripped with a hand when the user opens the seat 140. On the other hand, when the starting switch 70 is provided in the inside of the seat 140, preferably the starting switch 70 is buried at a location corresponding to a portion of the seat 140 with which the user touches when the user opens the seat 140.

Consequently, if the user opens the seat 140 in order to take out the helmet, then the starting switch 70 is operated into an ON state at the same time. As a result, the operability regarding starting of the electronic key system 10 can be improved.

Meanwhile, the power supply circuit 40 of the control apparatus 14 supplies power from the battery 60 to the CPU 42, receiving circuit 44, transmitting circuit 46 and other components.

The receiving circuit 44 has a receiving antenna not shown. The receiving circuit 44 receives a response signal Sa and so forth transmitted thereto from the electronic key 12 through the receiving antenna, extracts the response signal Sa from the carrier wave and demodulates the response signal Sa. The demodulated signal is supplied to the CPU 42.

The CPU 42 executes at least the following four programs: A request signal generating means 80, a request signal verifying means 82, an observing means 84 and a peripheral instruction means 86.

The request signal generating means 80 reads out request data Dr (data on which a request signal Sr is to be based) from a ROM not shown in response to an ON operation of the starting switch 70 or the main switch 62 and outputs the request data Dr to the transmitting circuit 46. Further, after the engine is started, the request signal generating means 80 reads out the request data Dr from the ROM after every fixed interval of time and outputs the request data Dr to the transmitting circuit 46. The fixed interval of time is set to one of time periods of 10 to 100 sec taking the consumption of the battery 20 in the electronic key 12 into consideration.

The transmitting circuit 46 modulates the carrier wave based on the request data Dr supplied thereto from the CPU 42 and outputs a resulting signal as a request signal Sr through the transmitting antenna 72.

In the actual vehicle 100A of the first embodiment 10A, as shown in FIG. 6, the transmitting antenna 72 is installed in the proximity of the center of the vehicle 100A. As shown in FIGS. 7A and 7B, the transmitting range of the request signal Sr is a spherical range of a radius of 1 to 1.5 m around the transmitting antenna 72 mounted on the vehicle 100A (a range indicated by a circle A in FIGS. 7A and 7B). The transmitting range of the request signal Sr is smaller than the transmitting range of the response signal Sa (range of a radius of several meters around the electronic key 12).

Accordingly, where it is assumed that the vehicle 100A is a scooter wherein a helmet storage space not shown is installed, for example, under the seat 140 as shown in FIGS. 7A and 7B, communication of the control apparatus with the electronic key 12 carried by the user may be performed with certainty when the user gets on and operates the actual vehicle 100A, when the user performs an operation to open the seat 140, when the user is traveling with the vehicle 100A, when the electronic key 12 is accommodated in the helmet storage space, and in any other case.

Here, a line segment (wheel base) 154 interconnecting the center 150a of a front wheel 150 and the center 152a of a rear wheel 152 is assumed. In this instance, a location in the proximity of the vehicle 100A is, for example, a position within a range from an upper portion to a lower portion of the vehicle 100A, and within a range from a point P1 at one fourth the wheel base 154 to another point P2 at three fourths the wheel base 154, with reference to the center 150a of the front wheel 150. In the vehicle 100A, the transmitting antenna 72 is installed in the proximity of a front portion of the seat 140.

Figure 10:
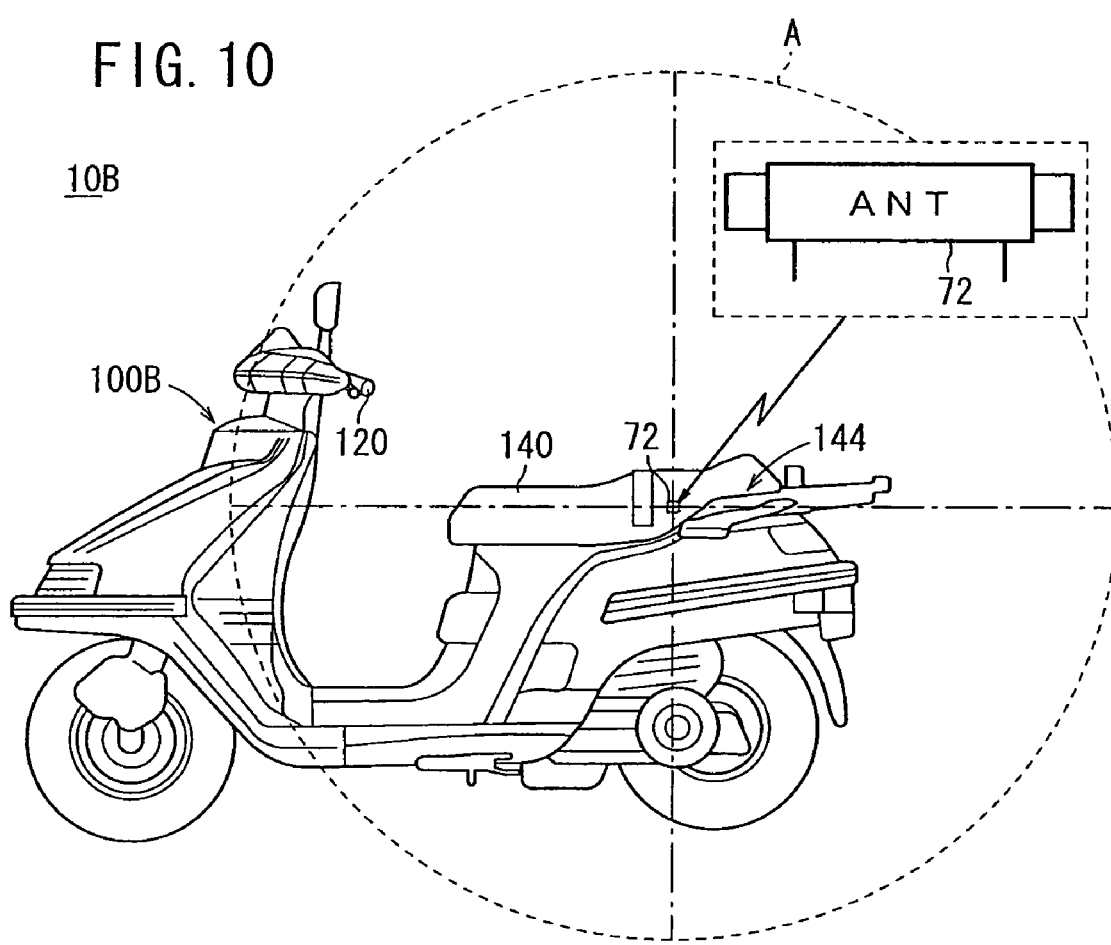
FIG. 10 is a side elevational view showing an example of a position at which a transmitting antenna is installed on an actual vehicle.
Figure 11:
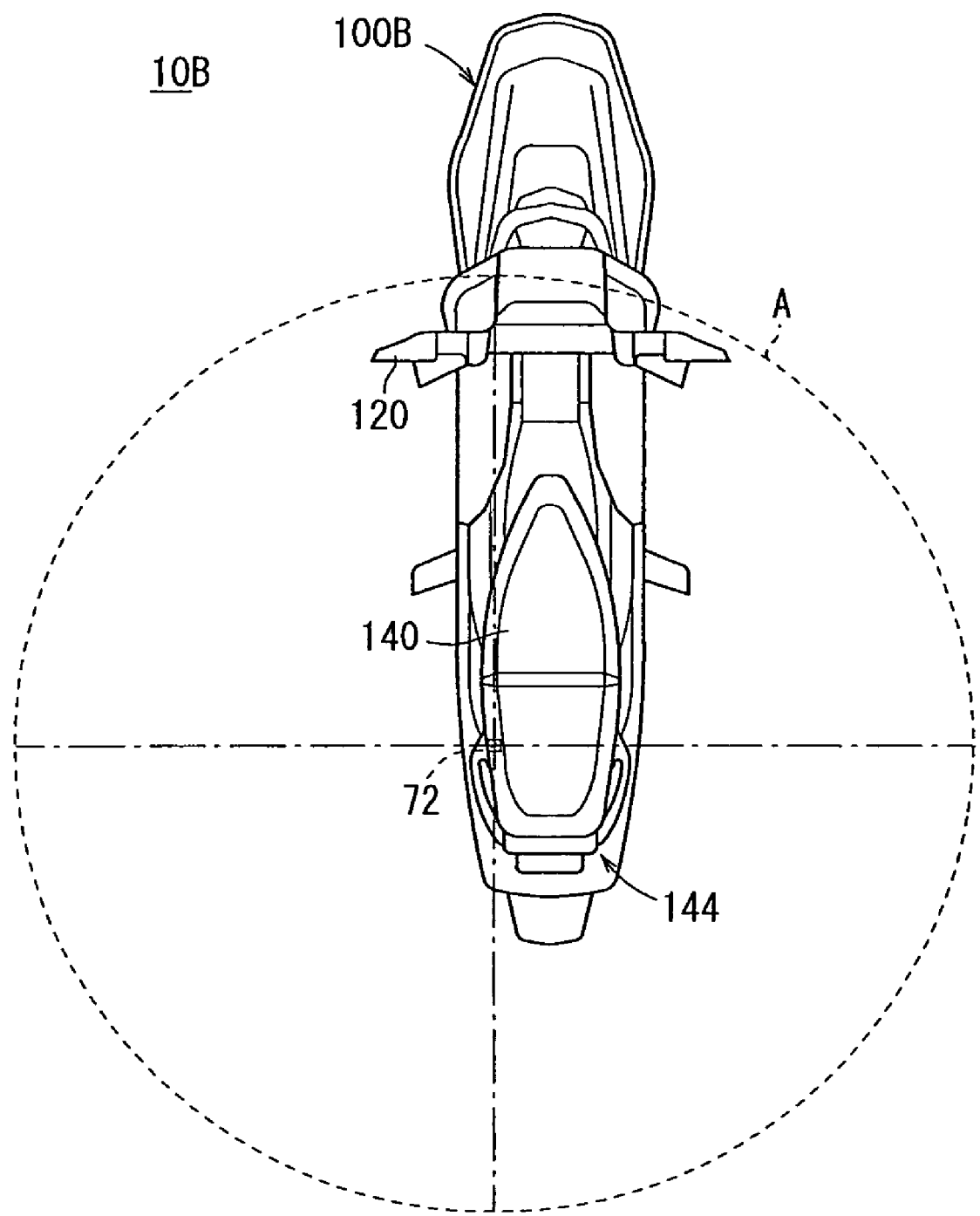
FIG. 11 is a top plan view showing the example of the position at which the transmitting antenna is installed on the actual vehicle.

Meanwhile, in the vehicle 100B of the second embodiment 10B, as shown in FIG. 8, the transmitting antenna 72 is installed on the seat 140 of the actual vehicle 100B or in the proximity of the seat 140. As shown in FIGS. 10 and 11, the transmitting range of the request signal Sr is a spherical range of a radius of 1 to 1.5 m around the transmitting antenna 72 mounted on the actual vehicle 100B (a range indicated by a circle A in FIGS. 10 and 11). The transmitting range of the request signal Sr is smaller than the transmitting range of the response signal Sa (range of a radius of several meters around the electronic key 12).

Accordingly, where it is assumed that the vehicle 100B is a scooter wherein the helmet storage space 142 (refer to FIG. 9) is installed, for example, under the seat 140 as shown in FIGS. 10 and 11, communication of the control apparatus 14 with the electronic key 12 can be carried by the user may be performed with certainty when the user performs an operation to open the seat 140, when the electronic key 12 is accommodated in the helmet storage space 142, and in some other case.

In FIGS. 10, 11 and 8, an example is shown wherein the transmitting antenna 72 is installed at a portion of a left side face of a rear portion of the seat 140 with which the user does not touch with its hand.

Alternatively, where the seat handle 144 is provided around a rear portion of the seat 140 as seen in FIG. 9, the transmitting antenna 72 is installed on the seat handle 144. Also in this instance, preferably the transmitting antenna 72 is installed at a portion with which the user does not normally touch with its hand.

The request signal verifying means 82 verifies whether or not a signal supplied thereto from the receiving circuit 44 is a response signal Sa. Further, when the signal mentioned is a response signal Sa, the request signal verifying means 82 verifies whether or not ID data included in the response signal Sa coincides with ID data registered in a memory not shown.

The observing means 84 observes based on an output of a request signal Sr whether or not a response signal Sa is terminated (whether or not coincidence of the ID is detected by the request signal verifying means 82). The observing means 84 enters a waiting state for an input of a response signal Sa at a point of time when the request signal generating means 80 outputs request data Dr. If a response signal Sa is not terminated within a predetermined period of time (when coincidence of the ID is not detected by the request signal verifying means 82), then the observing means 84 increments the count value by +1 to update it. Then, at a point of time when the count value becomes higher than a predetermined value, the observing means 84 outputs a warning signal Se to the third driving circuit 56.

Particularly if a response signal Sa is not terminated within the predetermined period of time after the point of time when the request data Dr is outputted in response to an ON operation of the starting switch 70 or the main switch 62, then at this stage, the observing means 84 outputs a warning signal Se to the third driving circuit 56.

The observing means 84 activates the peripheral instruction means 86 if a response signal Sa is terminated within the predetermined period of time after the point of time at which the request data Dr is outputted in response to an ON operation of the starting switch 70. The peripheral instruction means 86 outputs an unlocking signal to the first driving circuit 52 based on a request (for unlocking) from the observing means 84. Further, the peripheral instruction means 86 outputs an ON signal to the second driving circuit 54.

The first driving circuit 52 drives the actuator 64 in response to an input of the unlocking signal from the CPU 42 to cancel the locked state of the handle bar 102 and the seat 104.

The second driving circuit 54 is placed into an ON state in response to an input of the ON signal from the CPU 42. Thereafter, when the main relay 66 is placed into an ON state in response to an ON operation of the main switch 62, the second driving circuit 54 starts the engine to establish a state wherein the vehicle can run.

The third driving circuit 56 drives the warning lamp 68 in response to an input of the warning signal Se from the CPU 42 so that the warning lamp 68 emits light. For example, an LED can be used as the warning lamp 68.

It is to be noted that, if the main switch 62 is turned OFF, then the main relay 66 is turned OFF and also the engine stops simultaneously. Then, if a locking operation is performed, for example, if an operation to place the seat 104 or the seat 104 into a locked state is performed, then the verifying operation of the response signal Sa by the control apparatus 14 is stopped. Further, the second driving circuit 54 is placed into an OFF state.

Now, processing operation of the electronic key system 10A according to the first embodiment is described with reference to timing charts of FIGS. 12A to 12E. It is to be noted that a request signal Sr is a signal having a pulse string based on request data Dr, and a response signal Sa is a signal having a pulse string based on data including ID data. It is to be noted, however, that, in order to simplify the description, each of the request signal Sr and the response signal Sa is represented as a signal of one pulse in FIGS. 12A to 12E. Since processing operation of the electronic key system 10B according to the second embodiment is almost the same as the processing operation of the first embodiment explanation of the processing operation of the second embodiment has been omitted.

First, in a normal state, if the starting switch 70 is operated to an ON state at time t1 of FIG. 12A while the user holds the electronic key 12, then a request signal Sr is transmitted from the control apparatus 14 as seen in FIG. 12C (refer to time t2) and communication of the control apparatus 14 with the electronic key 12 is started.

When the user holds the electronic key 12, the request signal Sr is received through the receiving circuit 26 (refer to FIG. 2) of the electronic key 12. The electronic key 12 transmits a response signal Sa as seen in FIG. 12D in response to the receiving of the request signal Sr (refer to time t3). The response signal Sa is supplied through the receiving circuit 44 (refer to FIG. 3) of the control apparatus 14 to the CPU 42, by which ID data included in the response signal Sa is verified. If it is discriminated that the ID data exhibits coincidence, then the locked state of the handle bar 120 and the seat 140 is cancelled (unlocked) as seen in FIG. 12E through the control apparatus 14 and the first driving circuit 52 (refer to time t4). As a result of the unlocking procedure, steering by the handle bar 120 is enabled, and the seat 140 is slightly raised. Consequently, the user can easily recognize that the locked state of the handle bar 120 and the seat 140 has been released. Further, thereupon, the second driving circuit 54 is placed into an ON state.

Thereafter, if the user operates the main switch 62 into an ON state at time t5 of FIG. 12B while it holds the electronic key 12, then a request signal Sr is transmitted from the control apparatus 14 as seen in FIG. 12C (refer to time t6), and communication of the control apparatus 14 with the electronic key 12 is performed.

When the user holds the electronic key 12, the electronic key 12 transmits a response signal Sa as seen in FIG. 12D (refer to time t7) in response to the receiving of the request signal Sr in a similar manner as described hereinabove. The response signal Sa is supplied through the receiving circuit 44 of the control apparatus 14 to the CPU 42, by which ID data included in the response signal Sa is verified. If it is discriminated that the ID data exhibits coincidence, then the processing advances to a next step, that is, to a step at which the request signal Sr is outputted after every interval τ of time.

After this state, for example, the user is traveling with the actual vehicle 100A, and during the travel, the request signal Sr is outputted from the control apparatus 14 after every interval τ of time. In other words, communication of the control apparatus 14 with the electronic key 12 is performed after every interval τ of time, and the electronic key 12 outputs a response signal Sa after every substantially fixed interval τ of time.

The processing operation described above is a process after the user, holding the electronic key, gets on and activates the vehicle 100A until it operates the vehicle 100A. Now, a processing operation used when it is detected that the electronic key 12 is absent upon starting of the actual vehicle 100A is described.

First, if the user operates the starting switch 70 into an ON state while it does not hold the electronic key 12, then a request signal Sr is transmitted from the control apparatus 14. However, the control apparatus 14 does not perceive a response signal Sa to the request signal Sr outputted therefrom. As a result, the observing means 84 outputs a warning signal Se to the third driving circuit 56. Consequently, the warning lamp 68 is lit. Naturally, in this instance, such a process as unlocking of the handle bar 120 and the seat 140 or the like is not performed.

From the lighting of the warning lamp 68, the user can recognize that he does not hold the electronic key 12. Consequently, starting of the engine while the electronic key 12 is not held is prevented.

Now, a processing operation for the case when it is determined that the electronic key 12 is not present upon starting of the engine of the actual vehicle 100A is described.

First, if the user turns on the starting switch 70 while holding the electronic key 12, then a request signal Sr is transmitted from the control apparatus 14, and communication of the control apparatus 14 with the electronic key 12 is started. Through the communication, ID data included in a response signal is verified, and if it is discriminated that the ID data does not exhibit coincidence, then the locked state of the handle bar 120 and the seat 140 is canceled.

Then, if the user operates the main switch 62 into an ON state without recognizing that, for example, the electronic key 12 has been dropped, then although a request signal Sr is transmitted from the control apparatus 14, the control apparatus 14 does not receive a response signal Sa to the thus outputted request signal Sr any more. As a result, the observing means 84 outputs a warning signal Se to the third driving circuit 56, and consequently, the warning lamp 68 is lit.

From the lighting of the warning lamp 68, the user will recognize that the electronic key 12 has dropped. Consequently, otherwise possible loss of the electronic key 12 can be prevented.

Now, a processing operation for the case when it is determined that the electronic key 12 is not present while the vehicle 100A is running is described briefly.

First, processes after an ON operation of the starting switch 70 till an ON operation of the main switch 62 are same as those at times t1 to t7 in FIGS. 12A to 12E.

When the engine starts in response to the ON-operation of the main switch 62, the processing advances to a step at which a request signal Sr is outputted after every interval τ of time as described hereinabove. After this stage, the user is, for example, traveling with the actual vehicle 100A, and during the traveling, a request signal Sr is outputted from the control apparatus 14 after every interval τ of time.

If, for example, the electronic key 12 drops during travel of the vehicle 100A, then a response signal Sa is no longer received by the control apparatus 14. When a response signal Sa is not received within a predetermined interval of time after the point of time at which the request data Dr is outputted, the observing means 84 increments the count value by +1 to update it. At a point of time when the count value exceeds a predetermined value while a request signal Sr is successively outputted, the observing means 84 outputs a warning signal Se to the third driving circuit 56. Consequently, the warning lamp 68 is lit.

From the lighting of the warning lamp 68, the user will recognize that the electronic key 12 has dropped, and otherwise possible loss of the electronic key 12 can be prevented.

In this manner, in the electronic key system 10 according to the first embodiment, the transmitting antenna 72 of the control apparatus 14 (which transmits a request signal Sr) is installed in the proximity of the center of the actual vehicle 100A. Therefore, the request signal Sr transmitted from the control apparatus 14 is outputted from the location in the proximity of the center of the actual vehicle 100A.

Consequently, a substantially overall region of the actual vehicle 100A is included in the transmitting range. As a result, communication of the control apparatus 14 with the electronic key 12 can be performed with certainty when the user gets on and the vehicle 100A, when the user is operating with the vehicle 100A, upon opening or closing operation of the seat 140 and when the electronic key 12 is accommodated in the helmet storage space. In this instance, since the single transmitting antenna 72 may be installed, communication of the control apparatus 14 with the electronic key 12 in all of the situations described above can be achieved without increasing the cost and the weight, or increasing the required installation space and so forth.

Further, a bag in which the electronic key 12 is placed is sometimes accommodated in the helmet storage space provided under the seat 140. Also in this instance, however, communication between the control apparatus 14 and the electronic key 12 is performed with certainty. Consequently, a so-called shut-in state (a state wherein the seat 140 cannot be unlocked while the electronic key 12 remains accommodated in the helmet accommodating space) can be prevented.

In the electronic key system 10B according to the second embodiment, the transmitting antenna 72 of the control apparatus 14 is installed on the seat 140 or the seat handle 144 of the vehicle 100B. Therefore, the request signal Sr transmitted from the control apparatus 14 is outputted from the seat 140 or the seat handle 144. Consequently, the seat 140 and a region around the seat 140 are included in the transmitting range. As a result, communication of the control apparatus 14 with the electronic key 12 can be performed with certainty even if the electronic key 12 is placed in the helmet storage space 142, and a so-called shut-in state of a baggage or the like can be prevented.

Normally, the user opens or closes the seat 140 while standing on the left side of the actual vehicle 100B. Therefore, by mounting the transmitting antenna 72 on the left side face of the seat 140, communication of the control apparatus 14 with the electronic key 12 upon an operation to open or close the seat 140 can be performed with certainty.

Further, the seat handle 144 can normally be assembled later to the vehicle body of the actual vehicle 100B. Therefore, where the transmitting antenna 72 or the starting switch 70 is provided on the seat handle 144, the shape of the vehicle body or the path of wiring lines need not be changed significantly in order to provide the transmitting antenna 72 or the starting switch 70. In other words, the transmitting antenna 72 or the starting switch 70 can be installed with a slight design change, and also the cost can be reduced advantageously.

Figure 13:
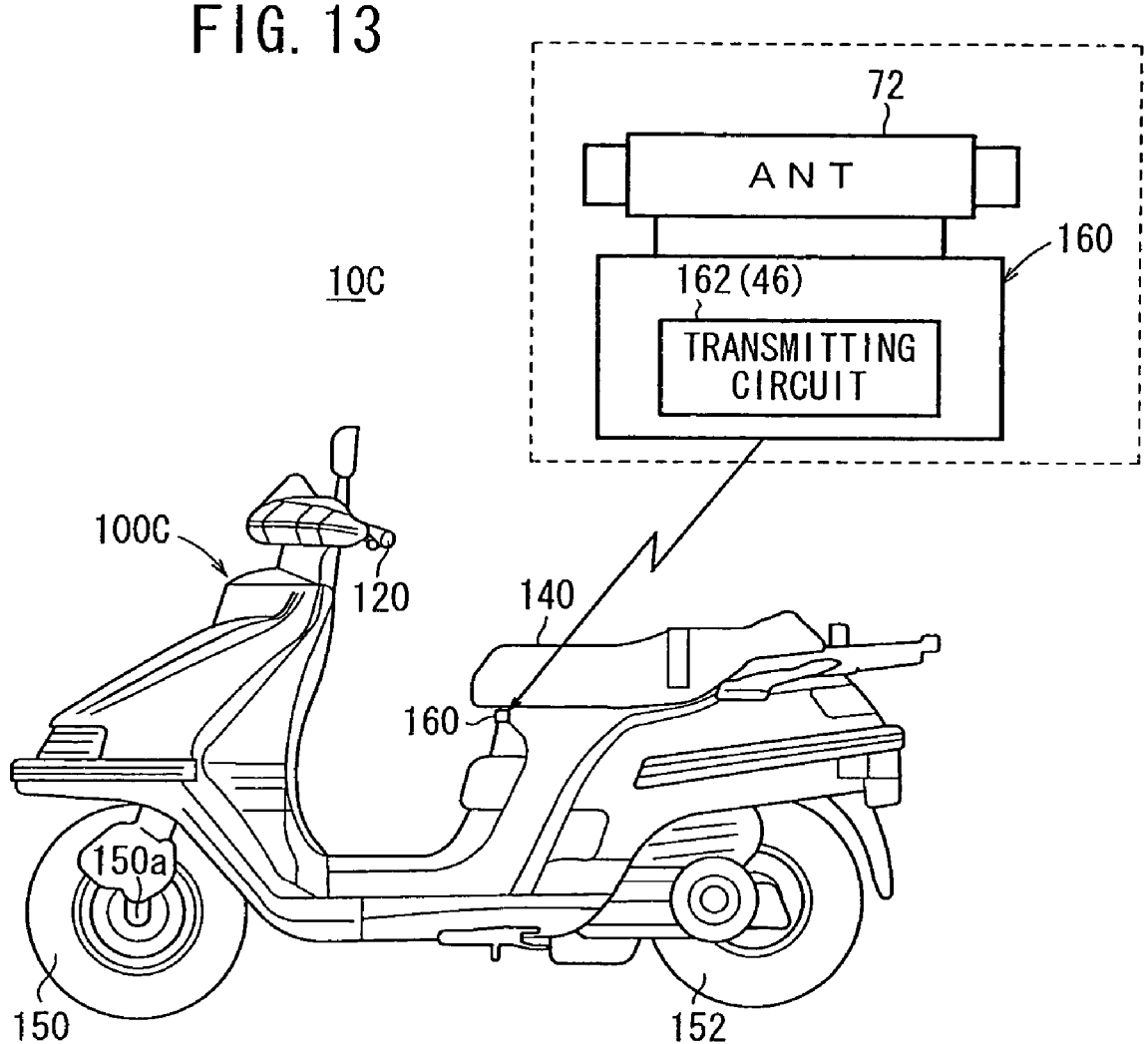
FIG. 13 is a schematic view showing an example wherein a transmitting unit of an electronic key system according to a third embodiment is mounted on an actual vehicle.
Figure 14:
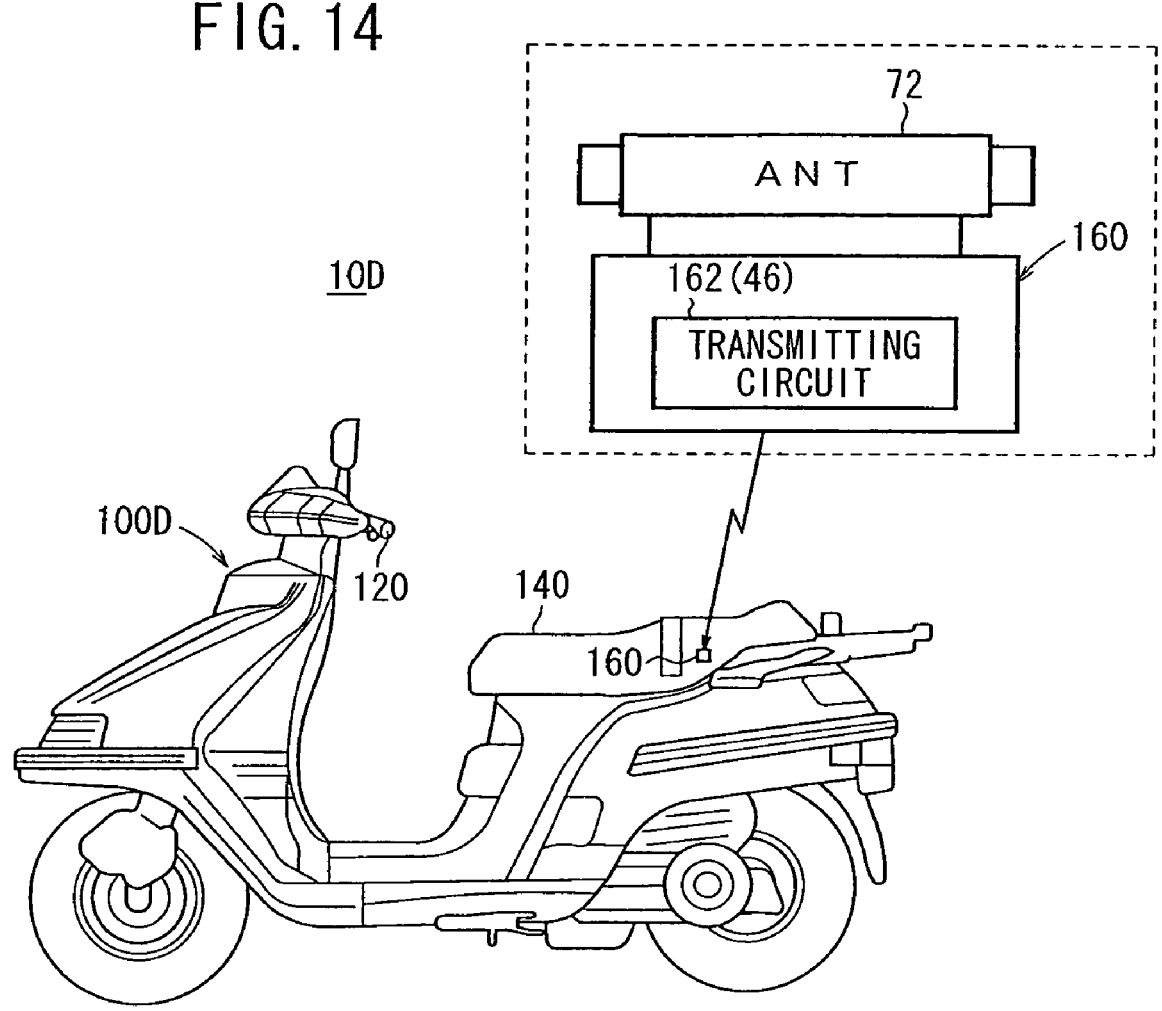
FIG. 14 is a schematic view showing an example wherein a transmitting unit of an electronic key system according to a fourth embodiment is mounted on an actual vehicle.

Subsequently, the electronic key systems 10C, 10D according to a third embodiment and a fourth embodiment are described with reference to FIGS. 13 to 15.

First, the electronic key system 10C according to the third embodiment has a configuration substantially similar to that of the electronic key system 10A according to the first embodiment described above. However, the electronic key system 10C is different from the electronic key system 10A in that a transmitting unit 160 is installed in the proximity of the center of an actual vehicle 100C as shown in FIG. 13.

The electronic key system 10D according to the fourth embodiment has a configuration substantially similar to that of the electronic key system 10A according to the first embodiment described above. However, the electronic key system 10D is different from the electronic key system 10A in that a transmitting unit 160 is installed on the seat 140 of the actual vehicle 100D or in the proximity of the seat 140 as shown in FIG. 14.

Figure 15:
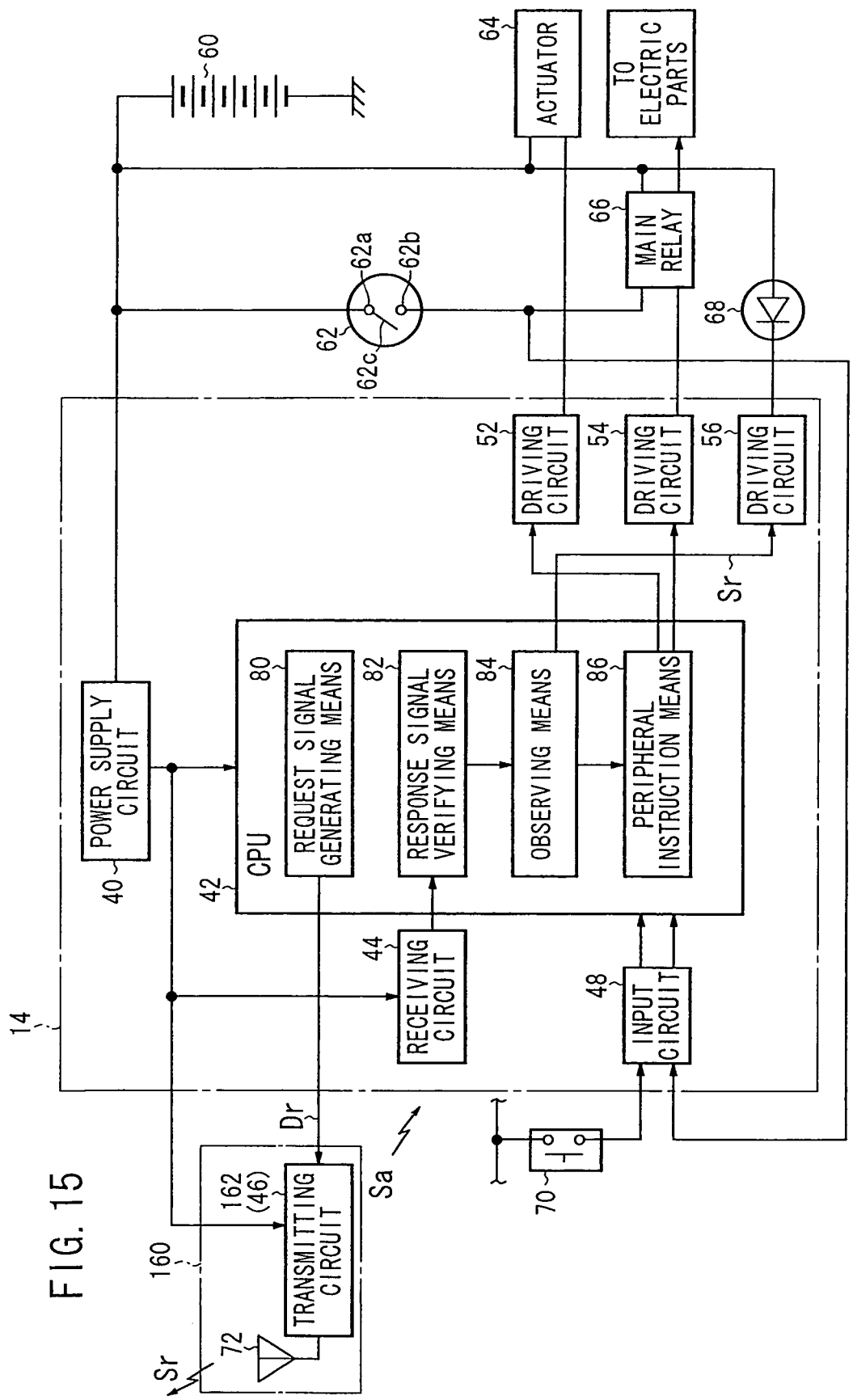
FIG. 15 is a block diagram showing a configuration of a control apparatus and the transmitting unit in the electronic key system according to the third embodiment and the fourth embodiment.

In the transmitting unit 160, the transmitting circuit 46 is separated from the control apparatus 14 formed from a system LSI so as to form a single electronic part 162 as shown in FIG. 15. The electronic part 162 is electrically connected to the transmitting antenna 72 so as to generally form a unit.

Figure 16:
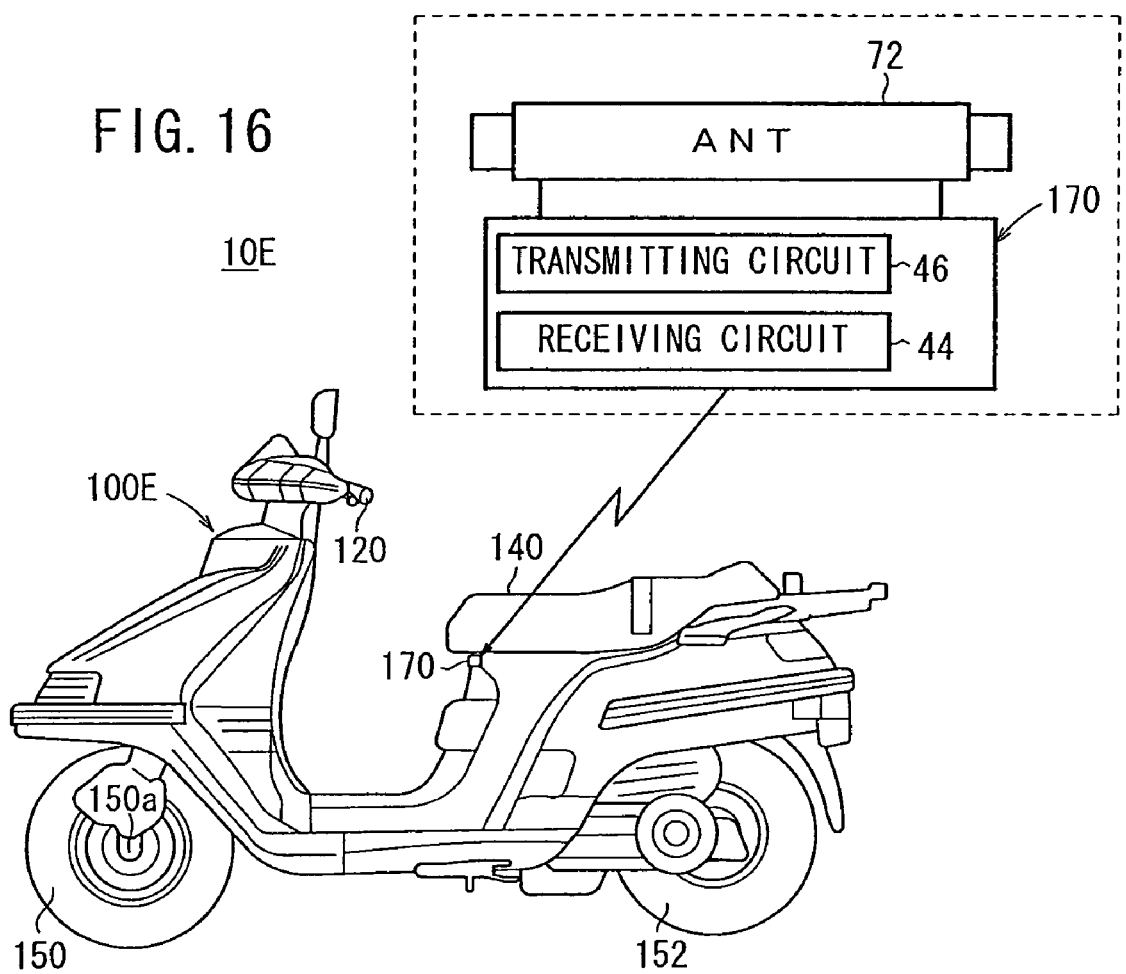
FIG. 16 is a schematic view showing an example wherein a transmitting/receiving unit of an electronic key system according to a fifth embodiment is mounted on an actual vehicle.
Figure 17:
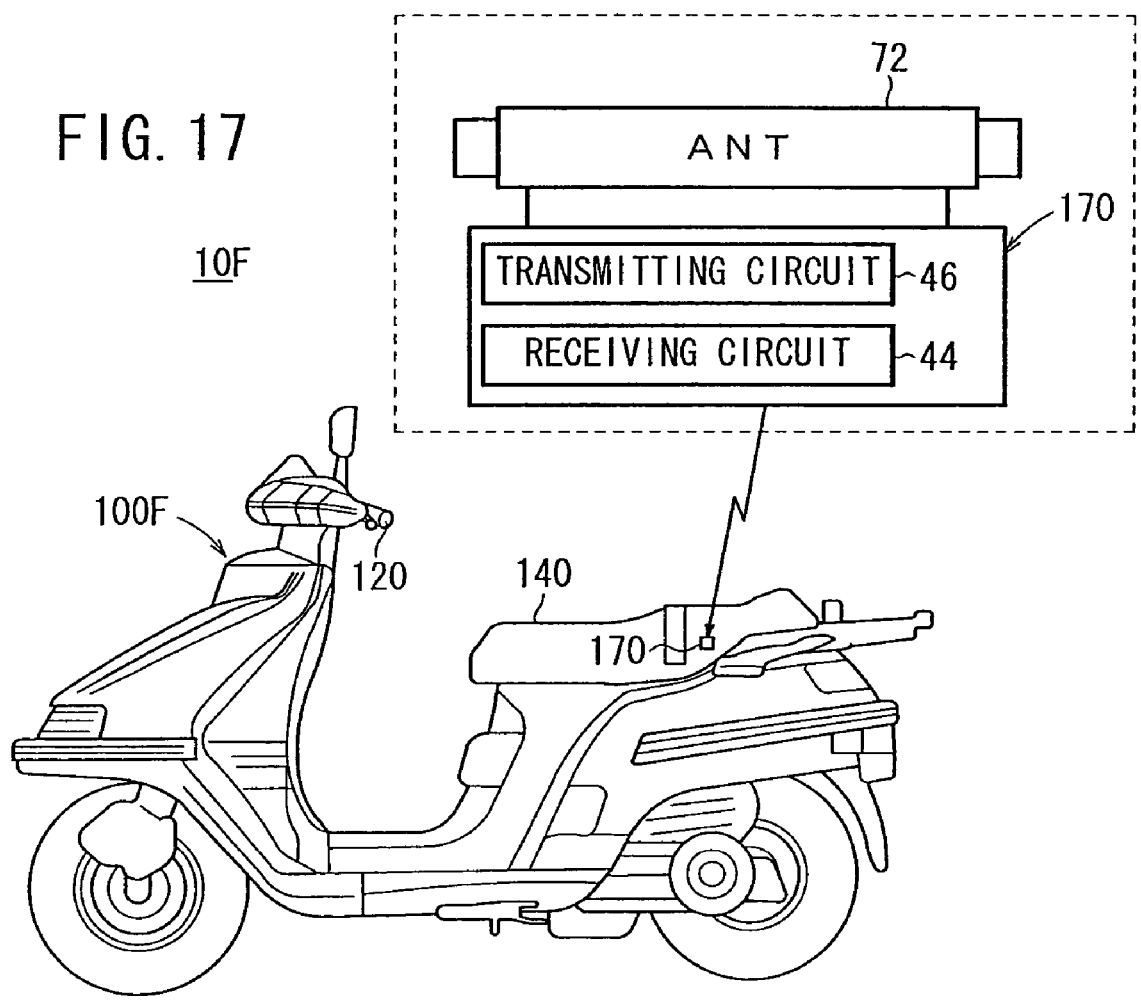
FIG. 17 is a schematic view showing an example wherein a transmitting/receiving unit of an electronic key system according to a sixth embodiment is mounted on an actual vehicle.
Figure 18:
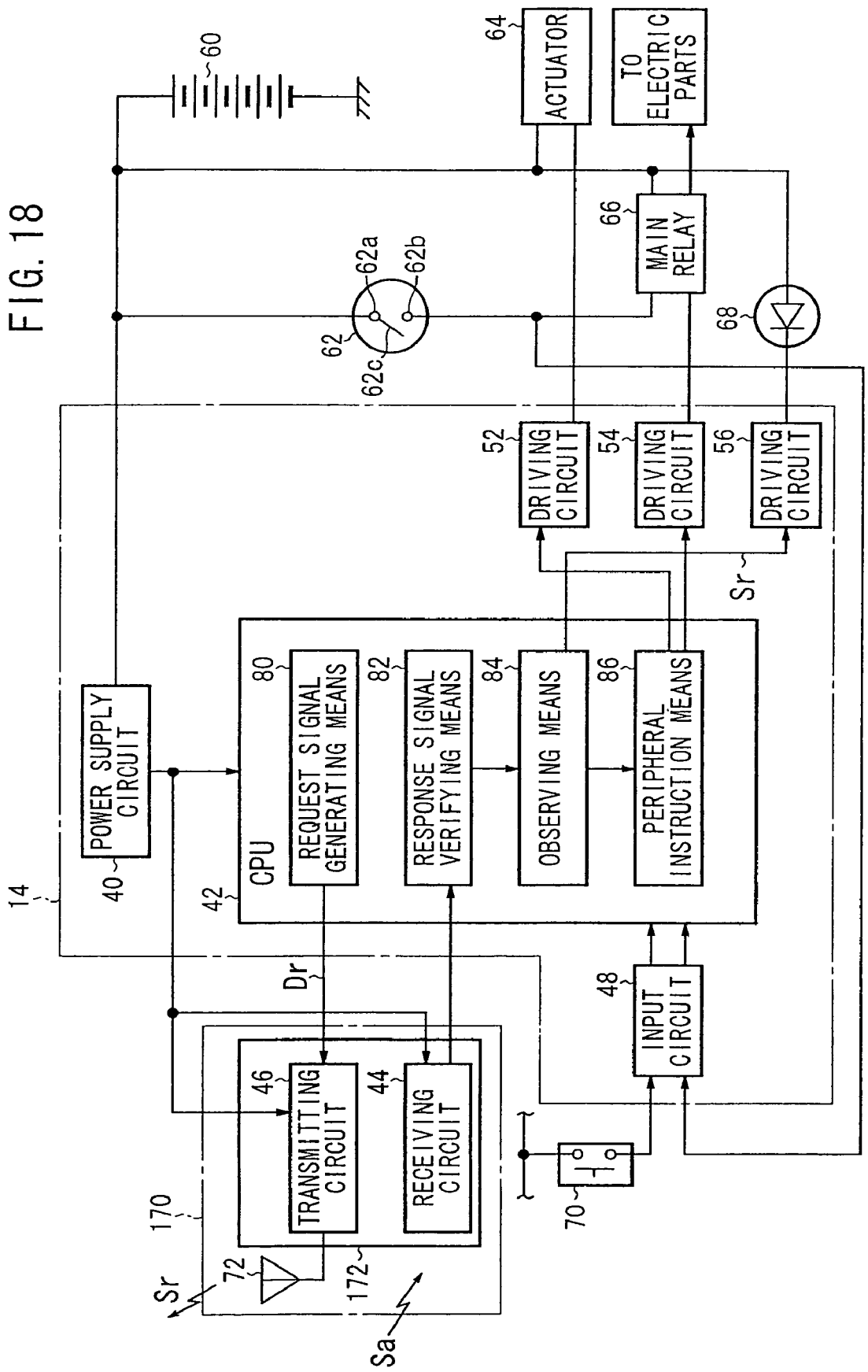
FIG. 18 is a block diagram showing a configuration of a control apparatus and the transmitting/receiving unit of the electronic key system according to the fifth embodiment and the sixth embodiment.

Subsequently, the electronic key systems 10E, 10F according to a fifth embodiment and a sixth embodiment are described with reference to FIGS. 16 to 18.

The electronic key system 10E according to the fifth embodiment has a configuration substantially similar to that of the electronic key system 10A according to the first embodiment described above. However, the electronic key system 10E is different from the electronic key system 10A in that a transmitting/receiving unit 170 is installed in the proximity of the center of an actual vehicle 100E as shown in FIG. 16.

The electronic key system 10F according to the sixth embodiment has a configuration substantially similar to that of the electronic key system 10A according to the first embodiment described above. However, the electronic key system 10F is different from the electronic key system 10A in that a transmitting/receiving unit 170 is installed on the seat 140 of the actual vehicle 100F or in the proximity of the seat 140 as shown in FIG. 17.

In the transmitting/receiving unit 170, the receiving circuit 44 and the transmitting circuit 46 are separated from the control apparatus 14 formed from a system LSI to form a single electronic part 172. Thus, the electronic part 172 includes the receiving circuit 44 and the transmitting circuit 46 integrated therein as seen in FIG. 18. The transmitting circuit 46 of the electronic part 172 and the transmitting antenna 72 are electrically connected to each other so as to generally form a unit.

The selection of which one of the electronic key systems 10A to 10F according to the first to the sixth embodiments described above should be determined by taking into consideration the size of the actual vehicles 100A to 100F, the paths of the wiring lines, the installation space for the transmitting antenna 72 and so.

It is to be noted that the electronic key system for a vehicle according to the present invention is not limited to the embodiment described above but can adopt various configurations without departing from the subject matter of the present invention.

The invention claimed is:

1. An electronic key system for a vehicle includes a control apparatus mounted on the vehicle and an electronic key, wherein
the control apparatus comprises a transmitting antenna,
the electronic key permits transmission of a response signal in response to receiving of a request signal transmitted from said control apparatus through the transmitting antenna,
said vehicle includes a seat which permits opening and closing movement and a locking apparatus for locking said seat to prevent opening of the seat until a unlocking instruction is supplied thereto;
said control apparatus includes a verifier which verifies the response signal and a driver which outputs an unlocking instruction to said locking apparatus when it is discriminated that the response signal is a request from a legal user; and
said transmitting antenna is installed on said seat or in the proximity of said seat.

2. An electronic key system for a vehicle according to claim 1, wherein said transmitting antenna is provided on a left side face of said seat.

3. An electronic key system for a vehicle according to claim 1, wherein
the vehicle comprises a seat handle which is used to manually open or close said seat, and is provided around a rear portion of said seat, and
said transmitting antenna is installed on said seat handle.

4. The electronic key system for a vehicle of claim 1, wherein the control apparatus and the electronic key communicate at regular intervals during operation of the vehicle.

5. The electronic key system for a vehicle of claim 4 wherein a warning is issued by the control apparatus if communication between the control apparatus and the electronic key fails for a predetermined length of time.

* * * * *